United States Patent
Periaswamy et al.

(10) Patent No.: US 7,657,072 B2
(45) Date of Patent: Feb. 2, 2010

(54) SYSTEM AND METHOD FOR AUTOMATIC EXTRACTION OF SPINAL CORD FROM 3D VOLUMETRIC IMAGES

(75) Inventors: Senthil Periaswamy, Malvern, PA (US); Yangming Ou, Philadelphia, PA (US); Anna Jerebko, West Chester, PA (US)

(73) Assignee: Siemens Medical Solutions USA, Inc, Malvern, PA (US)

( * ) Notice: Subject to any disclaimer, the term of this patent is extended or adjusted under 35 U.S.C. 154(b) by 695 days.

(21) Appl. No.: 11/516,211

(22) Filed: Sep. 6, 2006

(65) Prior Publication Data

US 2007/0092121 A1    Apr. 26, 2007

Related U.S. Application Data

(60) Provisional application No. 60/717,476, filed on Sep. 15, 2005.

(51) Int. Cl.
  *G06K 9/00* (2006.01)
(52) U.S. Cl. .................................................. 382/128
(58) Field of Classification Search ............... 382/128
  See application file for complete search history.

(56) References Cited

U.S. PATENT DOCUMENTS

| 6,396,939 | B1 | 5/2002 | Hu et al. |
| 6,608,916 | B1 | 8/2003 | Wei et al. |
| 2008/0044074 | A1 * | 2/2008 | Jerebko et al. ............... 382/128 |

FOREIGN PATENT DOCUMENTS

WO    WO 01/55965 A2    8/2001

\* cited by examiner

*Primary Examiner*—Bhavesh M Mehta
*Assistant Examiner*—Nirav G Patel

(57) ABSTRACT

A method of extracting a spinal cord from a digitized medical image includes providing a digitized medical image, selecting a set of points from said image as candidates for belonging to the spine, initializing a probability for each candidate point to belong to said spine, minimizing a weighted sum of square differences of image intensities of said candidate points and intensities determined by a mathematical model of said spine to estimate parameter values for said model, calculating a residual error for each point from the differences at each point between an estimated image intensity calculated from said estimated model parameters and an actual image intensity, updating the candidate point probabilities from said residual errors, and eliminating candidate points whose probability falls below a predetermined value.

21 Claims, 3 Drawing Sheets

SYSTEM AND METHOD FOR AUTOMATIC
EXTRACTION OF SPINAL CORD FROM 3D
VOLUMETRIC IMAGES

CROSS REFERENCE TO RELATED UNITED STATES APPLICATIONS

This application claims priority from "Method and Apparatus for Automatic extraction of spinal cord from 3D T2-weighted STIR images", U.S. Provisional Application No. 60/717,476 of Periaswamy, et al., filed Sep. 15, 2005, the contents of which are incorporated herein by reference.

TECHNICAL FIELD

This invention is directed to the analysis of and feature extraction from digital medical images.

DISCUSSION OF THE RELATED ART

Magnetic resonance imaging (MRI) produces high quality images from inside the human body based on the principles of nuclear magnetic resonance. The images are based on variations in the phase and frequency of radio frequency (RF) radiation absorbed and emitted by the imaged subject. The radiation interacts with those nuclei that spin, in particular hydrogen nuclei, which are single protons, causing them to produce a magnetic signal. The spinning proton itself can be regarding as a magnet that produces a magnetic field, and it is displaced from an equilibrium position by the signal from the imaging apparatus. The time constant which characterizes the return to equilibrium of a traverse magnetization resulting from the displacement is referred to as a spin-spin relaxation time and is denoted by $T_2$. An image whose intensity contrast is predominantly cause by differences in $T_2$ of the tissues is referred to as a $T_2$ weighted image.

A typical MRI signal comprises a sequence of RF pulses that can displace the intrinsic nuclear spins in a controlled manner. One such pulse sequence, referred to as an inversion recovery sequence, includes three pulses that cause successive spin flips of 180°, 90°, and 180°. The time between the initial 180° pulse and the 90° pulse is known as the time of inversion (TI), and control of this value can suppress the signal intensity from fatty tissues, which is useful when looking for signals from bones.

Short time inversion recovery imaging, referred to as STIR imaging has become quite popular in recent years. In particular, $T_2$ weighted STIR MR sequences have become a popular choice for several applications, such as whole body screening for bone metastasis. The advantage of this modality and the pulse sequence is that cancerous tissue is highlighted while fat is suppressed. In order to automatically identify and label bones and organs, for example in cancer detection using multi-modal registration, a reliable reference object is needed. The spinal cord appears consistently bright in this modality and is therefore suitable as a reference object.

SUMMARY OF THE INVENTION

Exemplary embodiments of the invention as described herein generally include methods and systems for automatically detecting the spinal cord without a prior model and with few assumptions regarding the data.

According to an aspect of the invention, there is provided a method extracting a spinal cord from a digitized medical image including the steps of providing a digitized medical image, said image comprising a plurality of intensities corresponding to a domain of points on an 3-dimensional grid, selecting a set of points from said image as candidates for belonging to the spine, initializing a probability for each candidate point to belong to said spine, minimizing a weighted sum of square differences of image intensities of said candidate points and intensities determined by a mathematical model of said spine to estimate parameter values for said model, calculating a residual error for each point from the differences at each point between an estimated image intensity calculated from said estimated model parameters and an actual image intensity, updating the candidate point probabilities from said residual errors, and eliminating candidate points whose probability falls below a predetermined value.

According to a further aspect of the invention, the steps of minimizing a weighted sum of square difference, calculating a residual error for each point, updating the candidate point probabilities, and eliminating candidate points are repeated until a total residual error is less than a pre-determined value, wherein said total residual error is a sum of the residual errors for each point.

According to a further aspect of the invention, the spine is modeled by a polynomial of the form $$I_i = \sum_{o=0}^{N-m-n} \sum_{n=0}^{N-m} \sum_{m=0}^{N} C_{m,n,o} x_i^m y_i^n z_i^o,$$

wherein $(x_i, y_i, z_i)$ are the coordinates of candidate point i, the exponents m, n, o are bounded by $m+n+o<=N$, and $C_{m,n,o}$ are the unknown model parameters and $I_i$ is the image intensity at point i.

According to a further aspect of the invention, the weighted sum of square differences is equal to $$\sum_{i=1}^{N} p_i \left( I_i - \sum_{o=0}^{N-m-n} \sum_{n=0}^{N-m} \sum_{m=0}^{N} C_{m,n,o} x_i^m y_i^n z_i^o \right)^2,$$

wherein $p_i$ is the candidate point probability, $I_i$ is the image intensity at point i, and N is the number of candidate points.

According to a further aspect of the invention, $R_i = (\hat{I}_i - I_i)^2$ is the residual error for each point i and the estimated image intensities $\hat{I}$ are calculated from $$\hat{I}_i = \sum_{o=0}^{N-m-n} \sum_{n=0}^{N-m} \sum_{m=0}^{N} \hat{C}_{m,n,o} x_i^m y_i^n z_i^o,$$

wherein $\hat{C}_{m,n,o}$ are the estimated model parameters.

According to a further aspect of the invention, the candidate point probabilities are updated according to $p_i \leftarrow p_i \exp(-R_i^2)$.

According to a further aspect of the invention, the exponents m, n, o are initially bounded by an upper bound $m+n+o<=1$, and further comprising increasing said upper bound after repeating said steps of minimizing a weighted sum of square difference, calculating a residual error for each point, and updating the candidate point probabilities for a plurality of iterations.

According to a further aspect of the invention, the method includes smoothing the intensities of said selected set of candidate points, sub-sampling said set of candidate points to a lower resolution set of points, repeating said steps of minimizing a weighted sum of square difference, calculating a residual error for each point, and updating the candidate point probabilities for a plurality of iterations, wherein at each step estimated model parameter values from the current step are used to initialize model parameter values for a next step at a higher resolution.

According to a further aspect of the invention, the sub-sampling is by a factor of a power of 2.

According to another aspect of the invention, there is provided a program storage device readable by a computer, tangibly embodying a program of instructions executable by the computer to perform the method steps for extracting a spinal cord from a digitized medical image.

DETAILED DESCRIPTION OF THE PREFERRED EMBODIMENTS

Figure 1:
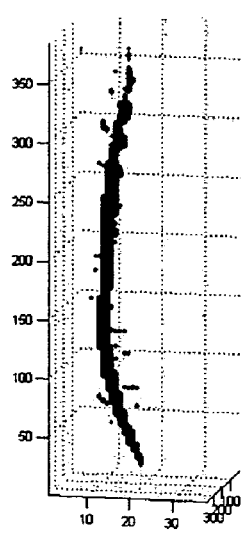
FIG. 1 depicts extracted points belonging a spinal cord, according to an embodiment of the invention.

Exemplary embodiments of the invention as described herein generally include systems and methods for automatically detecting the spinal cord without a prior model. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

In a T2-weighted STIR image, the spinal cord appears as a thin bright column along the spine. The spinal cord can be modeled as a global third-degree polynomial in 3D. In order to estimate the polynomial coefficients, if one knew which points belonged to the spinal cord, one could use least-squares, as there are many more points than model parameters, to estimate the model parameters. Conversely, if one knew the model parameters, one could determine which points belonged to the model. According to an embodiment of the invention, both the model parameters and the probability that a point belongs to the model are jointly estimated using an Expectation Maximization (EM) algorithm. Since the intensities along the spinal cord are known to be high, the probability that a point belongs to the spinal cord can be weighted by its intensity value. Furthermore, since the spinal cord is relatively thin, points that are horizontally closer are given more preference using an exponential weighting by horizontal distance. An exemplary, non-limiting weighting function is a Gaussian. An algorithm according to an embodiment of the invention uses a coarse to fine multiscale approach. The EM algorithm is initialized with the model parameters of a line in the approximate region of the spinal cord.

Expectation-maximization (EM) is a description of a class of related algorithms, not a specific algorithm. It is rather a recipe or meta-algorithm which is used to devise particular algorithms. An EM algorithm finds a maximum likelihood estimate of parameters in probabilistic models, where the model depends on unobserved latent variables. EM alternates between performing an expectation (E) step, which computes an expectation of the likelihood by including the latent variables as if they were observed, and a maximization (M) step, which computes the maximum likelihood estimates of the parameters by maximizing the expected likelihood found on the E step. The parameters found on the M step are then used to begin another E step, and the process is repeated. An exemplary EM type of algorithm is a maximum likelihood estimation of a finite mixture of Gaussians, where each component of the mixture can be estimated trivially if the mixing distribution is known.

Let y represent the incomplete data that includes values of the observable variables and x represent the missing data. Together, x and y form the complete data. The data x can be either actual missing measurements or a hidden variable that would make the problem easier if its value would be known.

To estimate the unobservable data, Let p be the joint probability distribution (continuous case) or probability mass function (discrete case) of the complete data with parameters given by the vector θ: $p(y, x|\theta)$. This function then provides the complete data likelihood. Note that the conditional distribution of the missing data given the observed data can be expressed as $$p(x|y, \theta) = \frac{p(y, x|\theta)}{p(y|\theta)} = \frac{p(y|x, \theta)p(x|\theta)}{\int p(y|x, \theta)p(x|\theta)dx}$$

using the Bayes rule and law of total probability. This formulation only requires knowledge of the observation likelihood given the unobservable data $p(y|x,\theta)$, as well as the probability of the unobservable data $p(x|\theta)$.

An EM algorithm will then iteratively improve an initial estimate $\theta_0$ and construct new estimates $\theta_1, \ldots, \theta_n, \ldots$. An exemplary individual re-estimation step that derives $\theta_{n+1}$ from $\theta_n$ can take the following form:

$$\theta_{n+1} = \arg\max_{\theta} E_x[\log p(y, x|\theta)|y]$$

where $E_x[\ ]$ is the conditional expectation of log $p(y,x|\theta)$ being taken with θ in the conditional distribution of x fixed at $\theta_n$. In other words, $\theta_{n+1}$ is the value that maximizes (M) the conditional expectation (E) of the complete data log-likelihood given the observed variables under the previous parameter value. This expectation is usually denoted as Q(θ). In the continuous case, it would be given by $$Q(\theta) = E[\log p(y, x|\theta)|y] = \int_{-\infty}^{\infty} p(x|y, \theta_n) \log p(y, x|\theta) dx.$$

Note that what is calculated in the first step are the fixed, data-dependent parameters of the function Q. Once the parameters of Q are known, it is fully determined and is maximized in the second (M) step of an EM algorithm.

An image volume I according to an embodiment of the invention comprises a plurality of points i on a grid that can be labeled in an xyz-coordinate system as $(x_i, y_i, Z_i)$. The notation $I_i$ refers to the image intensity at the point $(x_i, y_i, z_i)$. According to an embodiment of the invention, it can be assumed that at least some of these points, i.e. only those points that belong to the skeleton, can be modeled by one or more polynomials. An exemplary polynomial is of the form $$I_i = \sum_{o=0}^{N-m-n} \sum_{n=0}^{N-m} \sum_{m=0}^{N} C_{m,n,o} x_i^m y_i^n z_i^o$$

where N is the number of image points being considered. Note that the set of points can include the entire image, or alternatively, the set of points can be restricted to a subset of image points in the approximate region of the spine and known to include the spine.

According to an embodiment of the invention, it is sufficient for modeling the spine that m+n+o should be less than or equal to 3. Note that this is an upper limit on the sum of the exponents. In an embodiment of the invention using a linear model of the spine, the maximum of m+n+o should be 1, while in an embodiment of the invention using a quadratic model of the spine, the maximum of m+n+o should be 2. According to another embodiment of the invention, a linear model, and quadratic model, and a cubic model can all be used to model the spine, and an algorithm according to an embodiment of the invention will determine which of these models provides the best fit to the spine.

According to an embodiment of the invention, it is desired to determine which of the points $(x_i, y_i, z_i)$ belongs to the above model and to determine the model parameter coefficients $C_{m,n,o}$. These determinations can be performed by an EM algorithm.

Figure 3:
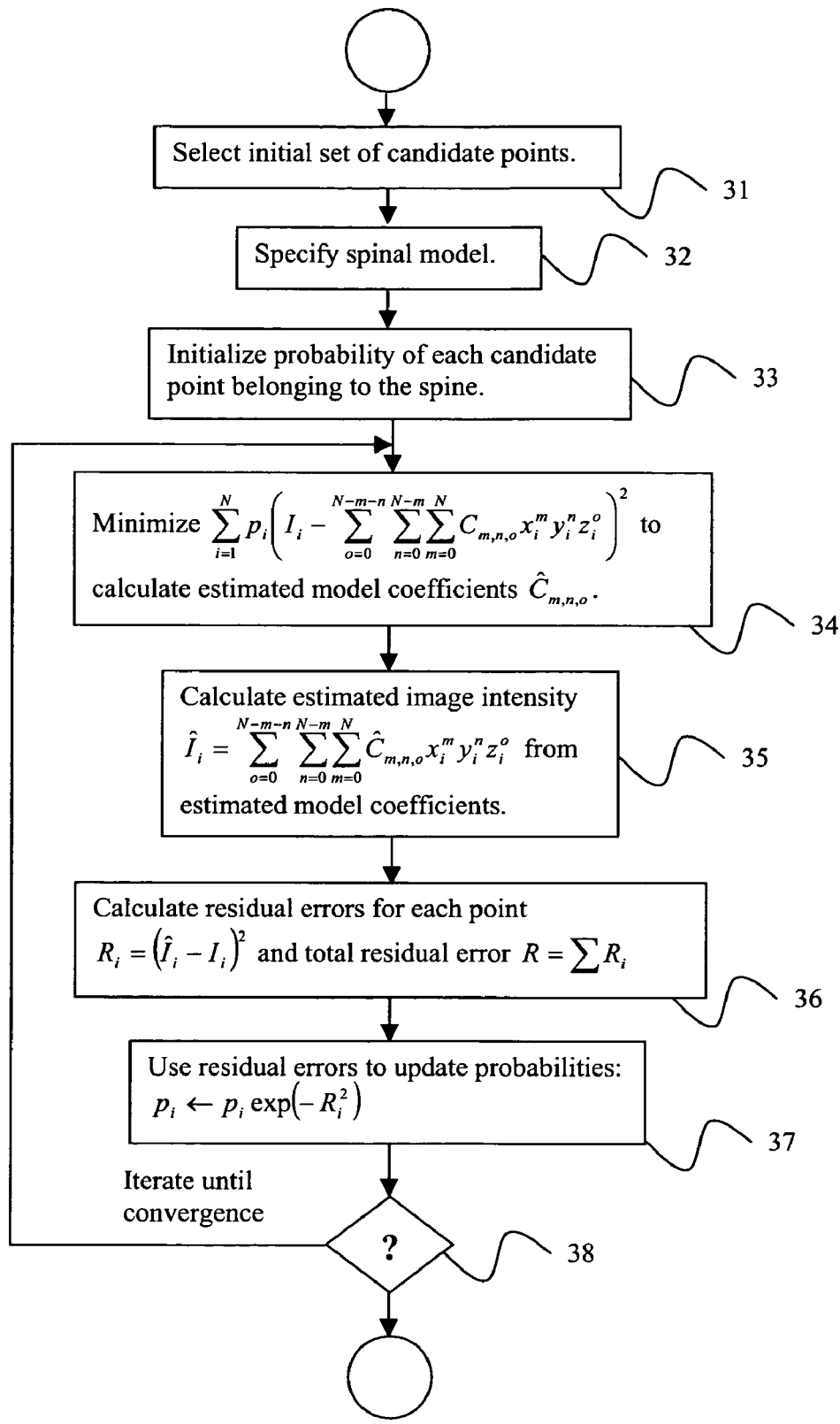
FIG. 3 is a flow chart of a method for spinal cord extraction according to an embodiment of the invention.

A flow chart of a spinal cord extraction method according to an embodiment of the invention is shown in FIG. 3. Referring now to the figure, a method begins at step 31 by selecting a set of points in an image as potential candidates for belonging to the spine. As stated above, this set can include the entire image. At step 32, a model for the spine is specified. An exemplary, non-limiting model is $$I_i = \sum_{o=0}^{N-m-n} \sum_{n=0}^{N-m} \sum_{m=0}^{N} C_{m,n,o} x_i^m y_i^n z_i^o,$$

where m+n+o[3.

A first step of the EM portion of a method according to an embodiment of the invention, is to provide at step 33 an initial set of probabilities $p_i \eta p(x_i, y_i, z_i)$ that specify the probability that a point i belongs to the spine. The particular form of these initial probabilities in unimportant. One exemplary, non-limiting initialization is $p_i=1/N$, where N is the number of points being considered. As stated above, N can be the entire set of points in the image. Another exemplary, non-limiting initialization is setting each $p_i$ to a random number. In this case, the $p_i$'s are constrained or normalized so that $$\sum_{i=1}^{N} p_i = 1.$$

The M-step of a method according to an embodiment of the invention, step 34, uses a weighted least squares that minimizes the quantity $$S = \sum_{i=1}^{N} p_i \left( I_i - \sum_{o=0}^{N-m-n} \sum_{n=0}^{N-m} \sum_{m=0}^{N} C_{m,n,o} x_i^m y_i^n z_i^o \right)^2$$

to calculate estimated coefficients $\hat{C}_{m,n,o}$, where the weights are the point probabilities.

In an estimation step of an EM algorithm according to an embodiment of the invention, the estimated coefficients $\hat{C}_{m,n,o}$ are plugged back into the expansion for $I_i$ at step 35 to calculate an estimated image intensity function $\hat{I}$:

$$\hat{I}_i = \sum_{o=0}^{N-m-n} \sum_{n=0}^{N-m} \sum_{m=0}^{N} \hat{C}_{m,n,o} x_i^m y_i^n z_i^o.$$

The total residual error R of the M-step is calculated at step 36 from $$R = \sum_{i=1}^{N} (\hat{I}_i - I_i)^2,$$

where $R_i = (\hat{I}_i - I_i)^2$ is the residual error for each point, which can then be used to update the probabilities at step 37. An exemplary, non-limiting update of individual point probabilities is $$p_i \leftarrow p_i \exp(-R_i^2),$$

followed by a re-normalization of the probabilities so that their sum is unity. Thus, a point with a large point-wise residual error will have its probability of being in the spine correspondingly reduced by the Gaussian factor. According to an embodiment of the invention, points whose probability of belonging to the spine drops below a threshold can be excluded from further consideration. This exclusion can be performed every iteration, or periodically after some number of iterations.

The M- and E- steps are repeated at step 38 until convergence, which can be determined by the total residual error.

It is to be understood that a user is not limited to using one model in the EM algorithm. In an exemplary embodiment of the invention, a linear model, a quadratic model, and a cubic model can be used to model the spine, and for each model is associated a set of probabilities. At each M-step, the coefficients of each model are determined from the weighted least squares, and the probability set associated with each model is updated by the point-wise residual errors calculated for that model. The model that converges most quickly can then be used to model the spine. In another exemplary embodiment of the invention, the degree of the model polynomial can be incremented as the EM-procedure progresses. According to this embodiment, a linear model can be used to initially model the spine. After convergence of the linear model, the set of points belonging to the spine in that model can be used as an initial set for a quadratic model. Similarly, after convergence of the quadratic model, the resulting set of points can be used to initialize the set of points for the cubic model.

According to another embodiment of the invention, a multi-scale approach is used. In a multi-scale approach, the initial set of points used to start the EM procedure is sub-sampled from the entire image set. The sub-sampled set, which has a lower resolution, is obtained from the image by using a filter to smooth the image, and then sub-sampling by a factor. An exemplary, non-limiting factor is a power of 2. The steps of filtering and sub-sampling can be repeated until the desired coarse resolution image is obtained. An exemplary filter for smoothing the image is a Gaussian. After the EM procedure has been repeated for some number of iterations, resolution is increased by including more points, reversing the sub-sampling. For example, if the sub-sampling was by a factor of a power of 2, the reversed sub-sampling is also by a factor of a power of 2. The number of iterations can be determined by examining the convergence of the residual error, or it can be pre-determined. The EM procedure is repeated until all points in the neighborhood of the spine are included and the convergence criteria is satisfied.

Figure 2:
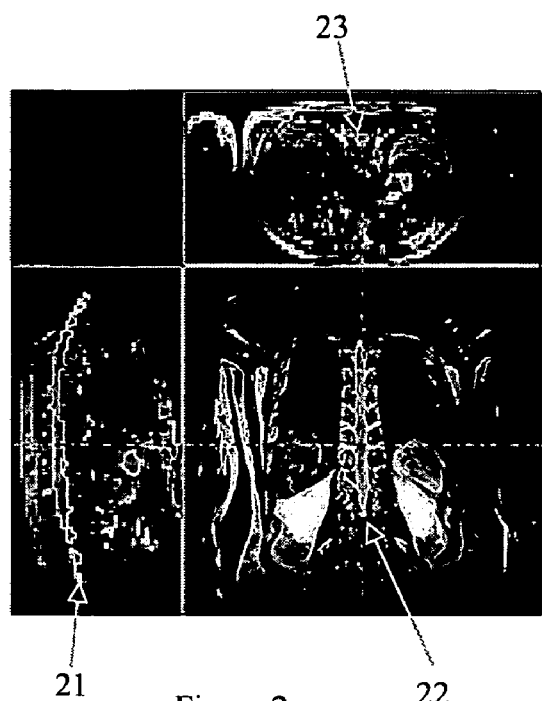
FIG. 2 shows the detected points overlaid on three orthogonal slices of the original image, according to an embodiment of the invention.

An algorithm according to an embodiment of the invention has been successfully tested on thirty five images. Sample results are shown in FIGS. 1 ands 2. FIG. 1 depicts those points that have been automatically detected by the algorithm as belonging to the spinal cord plotted in an xyz-coordinate system. The units along the axes are in voxels. FIG. 2 depicts the detected points 21, 22, 23 overlaid on three orthogonal slices of the original image.

It is to be understood that although the spinal cord extraction methods according to embodiments of the invention are described herein as being applied to $T_2$ weighted STIR MR sequences, the methods described herein are not limited in their applicability to MR sequences. A method according to an embodiment of the invention can be used to extract the spinal cord from images acquired through other modalities, such as computed tomography or positron emission tomography.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
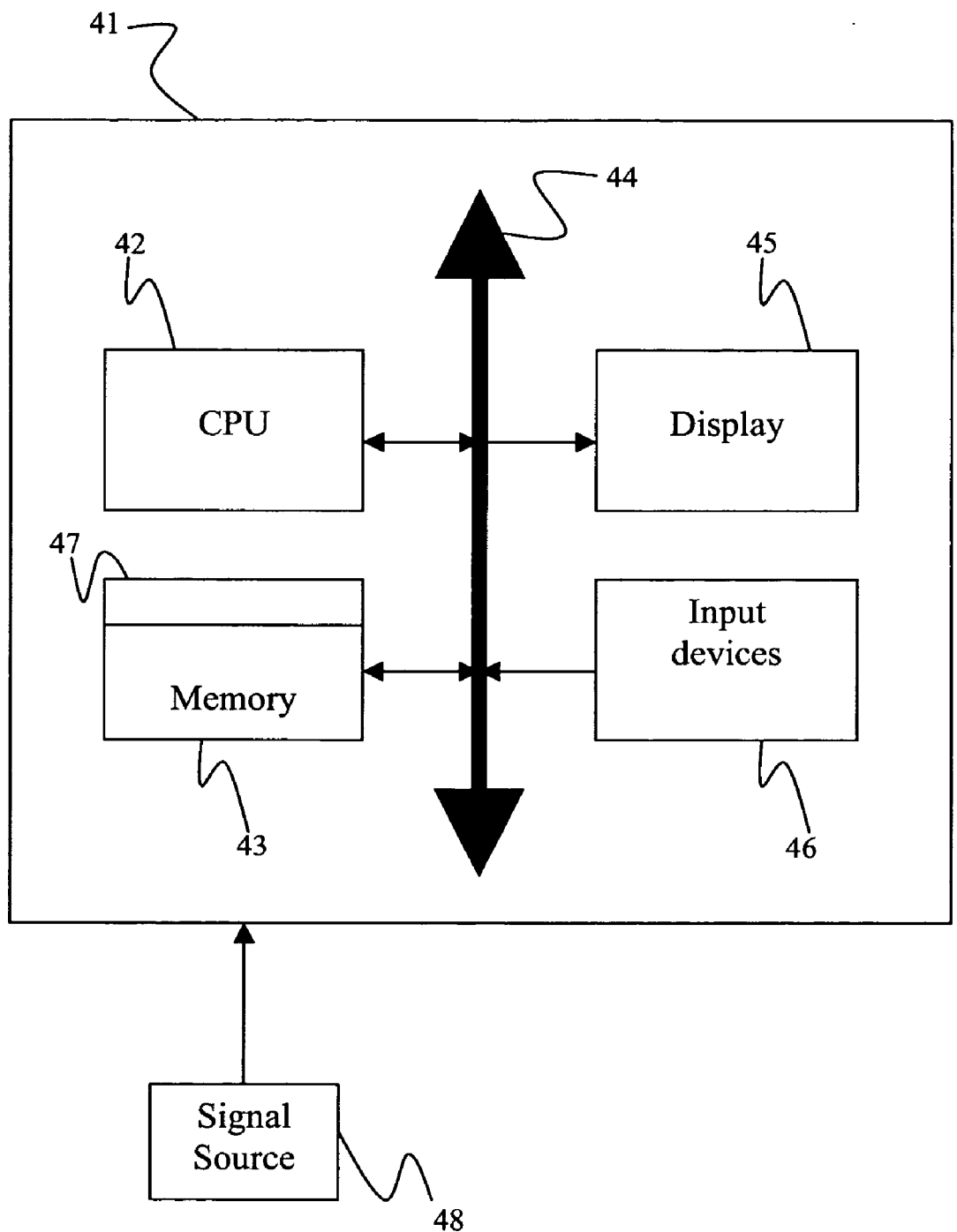
FIG. 4 is a block diagram of an exemplary computer system for implementing a spinal cord extraction method according to an embodiment of the invention.

FIG. 4 is a block diagram of an exemplary computer system for implementing a spinal cord extraction method according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of extracting a spinal cord from a digitized medical image comprising the steps of:

providing a digitized medical image, said image comprising a plurality of intensities corresponding to a domain of points on an 3-dimensional grid;

selecting a set of points from said image as candidates for belonging to the spine;

initializing a probability for each candidate point to belong to said spine;

minimizing a weighted sum of square differences of image intensities of said candidate points and intensities determined by a mathematical model of said spine to estimate parameter values for said model;

calculating a residual error for each point from the differences at each point between an estimated image intensity calculated from said estimated model parameters and an actual image intensity;

updating the candidate point probabilities from said residual errors; and eliminating candidate points whose probability falls below a predetermined value.

2. The method of claim 1, wherein said steps of minimizing a weighted sum of square difference, calculating a residual error for each point, updating the candidate point probabilities, and eliminating candidate points are repeated until a total residual error is less than a pre-determined value, wherein said total residual error is a sum of the residual errors for each point.

3. The method of claim 1, wherein said spine is modeled by a polynomial of the form $$I_i = \sum_{o=0}^{N-m-n} \sum_{n=0}^{N-m} \sum_{m=0}^{N} C_{m,n,o} x_i^m y_i^n z_i^o,$$

wherein $(x_i, y_i, z_i)$ are the coordinates of candidate point i, the exponents m, n, o are bounded by m+n+o<=N, and $C_{m,n,o}$ are the unknown model parameters and $I_i$ is the image intensity at point i.

4. The method of claim 3, wherein said weighted sum of square differences is equal to $$\sum_{i=1}^{N} p_i \left( I_i - \sum_{o=0}^{N-m-n} \sum_{n=0}^{N-m} \sum_{m=0}^{N} C_{m,n,o} x_i^m y_i^n z_i^o \right)^2,$$

wherein $p_i$ is the candidate point probability, $I_i$ is the image intensity at point i, and N is the number of candidate points.

5. The method of claim 4, wherein $R_i = (\hat{I}_i - I_i)^2$ is the residual error for each point i and the estimated image intensities $\hat{I}$ are calculated from $$\hat{I}_i = \sum_{o=0}^{N-m-n} \sum_{n=0}^{N-m} \sum_{m=0}^{N} \hat{C}_{m,n,o} x_i^m y_i^n z_i^o,$$

wherein $\hat{C}_{m,n,o}$ are the estimated model parameters.

6. The method of claim 5, wherein said candidate point probabilities are updated according to $p_i \leftarrow p_i \exp(-R_i^2)$.

7. The method of claim 3, wherein said exponents m, n, o are initially bounded by an upper bound m+n+o<=1, and further comprising increasing said upper bound after repeating said steps of minimizing a weighted sum of square difference, calculating a residual error for each point, and updating the candidate point probabilities for a plurality of iterations.

8. The method of claim 1, further comprising smoothing the intensities of said selected set of candidate points, subsampling said set of candidate points to a lower resolution set of points, repeating said steps of minimizing a weighted sum of square difference, calculating a residual error for each point, and updating the candidate point probabilities for a plurality of iterations, wherein at each step estimated model parameter values from the current step are used to initialize model parameter values for a next step at a higher resolution.

9. The method of claim 8, wherein said sub-sampling is by a factor of a power of 2.

10. A method of extracting a spinal cord from a digitized medical image comprising the steps of:
   selecting a set of points from a digitized medical image as candidates for belonging to the spinal cord;
   specifying a plurality of mathematical models of said spinal cord;
   initializing a probability for each candidate point to belong to said spine;
   minimizing, for each spinal model, a weighted sum of square differences of image intensities of said candidate points and intensities determined by each said mathematical model of said spine to estimate parameter values for each said model;
   calculating estimated image intensities from said estimated model parameter values for each spinal model;
   calculating, for each spinal model, a residual error for each point from the differences at each point between said estimated image intensity and an actual image intensity; and
   updating the candidate point probabilities from said residual errors, wherein an updated candidate probability is provided for each spinal model.

11. The method of claim 10, wherein said steps of minimizing a weighted sum of square difference, calculating estimated image intensities, calculating a residual error for each point, and updating the candidate point probabilities are repeated until a total residual error for one spinal model is less than a pre-determined value, wherein said one spinal model is used to extract said spinal cord from said image.

12. The method of claim 11, wherein said total residual error is a sum of the residual errors for each point.

13. A program storage device readable by a computer, tangibly embodying a program of instructions executable by the computer to perform the method steps for extracting a spinal cord from a digitized medical image, said method comprising the steps of:
   providing a digitized medical image, said image comprising a plurality of intensities corresponding to a domain of points on an 3-dimensional grid;
   selecting a set of points from said image as candidates for belonging to the spine;
   initializing a probability for each candidate point to belong to said spine;
   minimizing a weighted sum of square differences of image intensities of said candidate points and intensities determined by a mathematical model of said spine to estimate parameter values for said model;
   calculating a residual error for each point from the differences at each point between an estimated image intensity calculated from said estimated model parameters and an actual image intensity;
   updating the candidate point probabilities from said residual errors; and
   eliminating candidate points whose probability falls below a predetermined value.

14. The computer readable program storage device of claim 13, wherein said steps of minimizing a weighted sum of square difference, calculating a residual error for each point, updating the candidate point probabilities, and eliminating candidate points are repeated until a total residual error is less than a pre-determined value, wherein said total residual error is a sum of the residual errors for each point.

15. The computer readable program storage device of claim 13, wherein said spine is modeled by a polynomial of the form $$I_i = \sum_{o=0}^{N-m-n} \sum_{n=0}^{N-m} \sum_{m=0}^{N} C_{m,n,o} x_i^m y_i^n z_i^o,$$

wherein $(x_i, y_i, z_i)$ are the coordinates of candidate point i, the exponents m, n, o are bounded by m+n+o<=N, and $C_{m,n,o}$ are the unknown model parameters and $I_i$ is the image intensity at point i.

16. The computer readable program storage device of claim 15, wherein said weighted sum of square differences is equal to $$\sum_{i=1}^{N} p_i \left( I_i - \sum_{o=0}^{N-m-n} \sum_{n=0}^{N-m} \sum_{m=0}^{N} C_{m,n,o} x_i^m y_i^n z_i^o \right)^2,$$

wherein $p_i$ is the candidate point probability, $I_i$ is the image intensity at point i, and N is the number of candidate points.

17. The computer readable program storage device of claim 16, wherein $R_i = (\hat{I}_i - I_i)^2$ is the residual error for each point i and the estimated image intensities $\hat{I}$ are calculated from $$\hat{I}_i = \sum_{o=0}^{N-m-n} \sum_{n=0}^{N-m} \sum_{m=0}^{N} \hat{C}_{m,n,o} x_i^m y_i^n z_i^o,$$

wherein $\hat{C}_{m,n,o}$ are the estimated model parameters.

18. The computer readable program storage device of claim 17, wherein said candidate point probabilities are updated according to $p_i \leftarrow p_i \exp(-R_i^2)$.

19. The computer readable program storage device of claim 15, wherein said exponents m, n, o are initially bounded by an upper bound m+n+o<=1, and further comprising increasing said upper bound after repeating said steps of minimizing a weighted sum of square difference, calculating a residual error for each point, and updating the candidate point probabilities for a plurality of iterations.

20. The computer readable program storage device of claim 13, the method further comprising smoothing the intensities of said selected set of candidate points, sub-sampling said set of candidate points to a lower resolution set of points, repeating said steps of minimizing a weighted sum of square difference, calculating a residual error for each point, and updating the candidate point probabilities for a plurality of iterations, wherein at each step estimated model parameter values from the current step are used to initialize model parameter values for a next step at a higher resolution.

21. The computer readable program storage device of claim 20, wherein said sub-sampling is by a factor of a power of 2.

* * * * *